United States Patent
DelValle et al.

(10) Patent No.: US 6,642,680 B2
(45) Date of Patent: Nov. 4, 2003

(54) MULTI-RATE COMMUTATION OF MOTORS

(75) Inventors: Jesus Manny DelValle, Irvine, CA (US); Prakash Sreenivasa Kasturi, Rancho Santa Margarita, CA (US); Adrian S. Nastase, Huntington Beach, CA (US)

(73) Assignee: Newport Corporation, Irvine, CA (US)

( * ) Notice: Subject to any disclaimer, the term of this patent is extended or adjusted under 35 U.S.C. 154(b) by 2 days.

(21) Appl. No.: 10/101,675

(22) Filed: Mar. 18, 2002

(65) Prior Publication Data

US 2003/0076059 A1 Apr. 24, 2003

Related U.S. Application Data

(60) Provisional application No. 60/343,801, filed on Oct. 24, 2001.

(51) Int. Cl.[7] .............................................. H02K 23/00
(52) U.S. Cl. ...................... 318/254; 318/138; 318/439; 318/610; 318/561; 318/567
(58) Field of Search ................................. 318/254, 138, 318/439, 561, 568.1, 610, 701, 567

(56) References Cited

U.S. PATENT DOCUMENTS

| | | | | |
|---|---|---|---|---|
| 5,637,974 A | * | 6/1997 | McCann | 318/701 |
| 5,982,117 A | * | 11/1999 | Taylor et al. | 318/254 |
| 6,259,221 B1 | * | 7/2001 | Yutkowitz | 318/561 |

* cited by examiner

*Primary Examiner*—Karen Masih
(74) *Attorney, Agent, or Firm*—Irell & Manella LLP

(57) ABSTRACT

A motor control system that determines a number of commutation values during each control cycle of the system. Determining a plurality of commutation values provides a system with a higher frequency of commutation updates without having to increase the speed of the control cycle. This allows for a smoother operation of a motor without having to increase the speed of the control system processor.

23 Claims, 4 Drawing Sheets

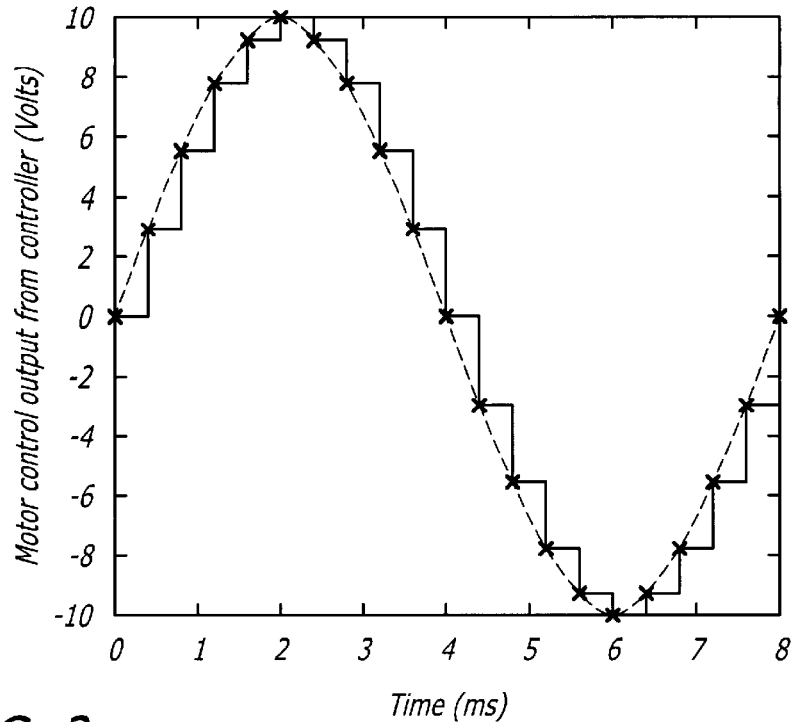
FIG. 2 *(Prior Art)*
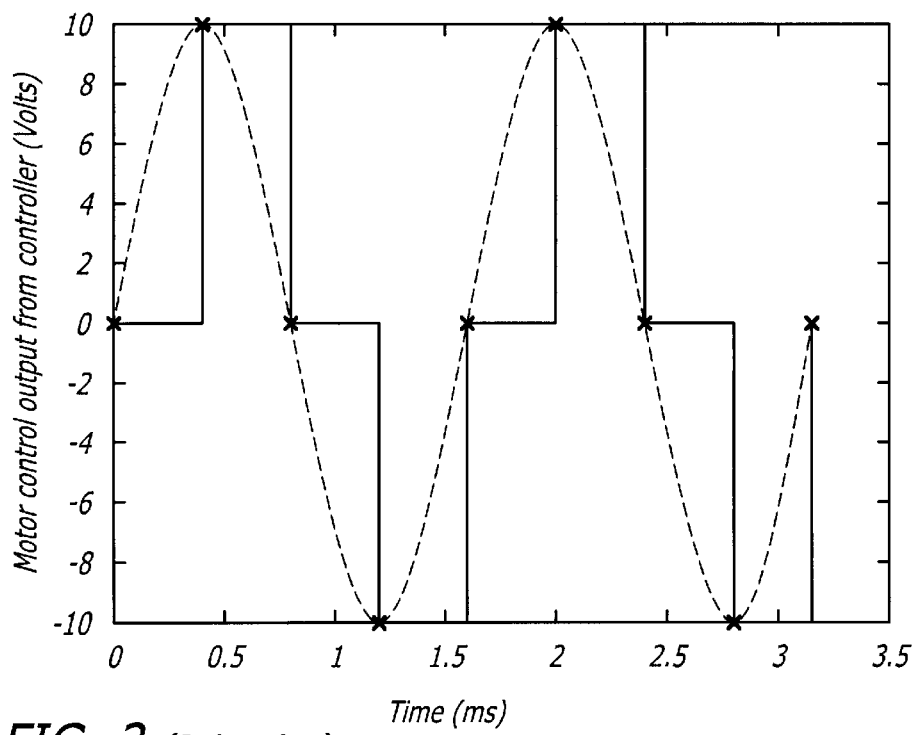
FIG. 3 *(Prior Art)*

Multi-rate Commutation

MULTI-RATE COMMUTATION OF MOTORS

REFERENCE TO CROSS-RELATED APPLICATIONS

This application claims priority to Provisional Application No. 60/343,801 filed on Oct. 24, 2001.

BACKGROUND OF THE INVENTION

1. Field of the Invention

The subject matter disclosed generally relates to the field of commutation control for electric motors.

2. Background Information

Equipment used to manufacture parts may contain mobile stages or platforms. For example, semiconductor fabrication equipment may have a stage that moves a wafer relative to a laser. The mobile stages may be driven by stepper motors that incrementally move a table of the stage. The stepper motors are typically controlled by a computer that moves the stage in accordance with a software or firmware routine.

FIG. 1 shows a control system 1 that is used to move the stage. The system includes a motor driver 2 that is connected to a motorized positioner 3. The motorized positioner 3 may include a stepper motor attached to a table or platform. The table or motor may have a position sensor 4 that provides feedback information regarding the actual position of the stage.

The system receives a desired trajectory value from a trajectory generator 5. The feedback signal from the sensor 4 is summed with the desired value by summing junction 6 to produce an error value. The error value is processed by a position/velocity loop controller 7. The controller 7 generates a commutation signal that is provided to the motor driver 2 to move the positioner 3. The process of generating an error signal and processing the error to a commutation signal occurs once every "control cycle". The frequency of the control cycle is limited by the speed of the loop of controller 7.

FIG. 2 shows a conventional sinusoidal commutation at relatively low motor speeds. The controller provides a series of step functions generated at the end of each control cycle. At lower speeds the process works relatively smoothly.

FIG. 3 shows a conventional sinusoidal commutation at relatively fast motor speeds. The motor speed is such that the desired commutation rate is close to the control cycle of the control system. Here the frequency of generated commutation signals approximates the required commutation frequency required to run the motor at the desired speed. The overlap in frequencies can create a frequency beat that approaches the resonant frequency of the motor. This can increase the acoustic noise and can create a roughness in the operation of the motor.

One solution would be to increase the speed of the control cycle to far exceed the desired commutation speed. This would require a faster controller, which increases the cost of the system.

BRIEF SUMMARY OF THE INVENTION

A motor control system that can control a motor. The motor is driven by a commutation signal that is a function of a desired trajectory value. The control system generates an error signal as a function of the desired trajectory value and a feedback signal. An error signal is created within a single control cycle. The system contains a controller that generates a plurality of commutation signals within each control cycle.

BRIEF DESCRIPTION OF THE DRAWINGS

FIG. 2 is a graph showing an output of a controller in the control system of the prior art where the motor is operating at a relatively low speed;

FIG. 3 is a graph showing the output of the controller of the prior art where the motor is operating at a relatively high speed;

DETAILED DESCRIPTION

Disclosed is a motor control system that determines a number of commutation values during each control cycle of the system. Determining a plurality of commutation values provides a system with a higher frequency of commutation updates without having to increase the speed of the control cycle. This allows for smoother operation of a motor without having to increase the speed of the control system processor.

Figure 4:
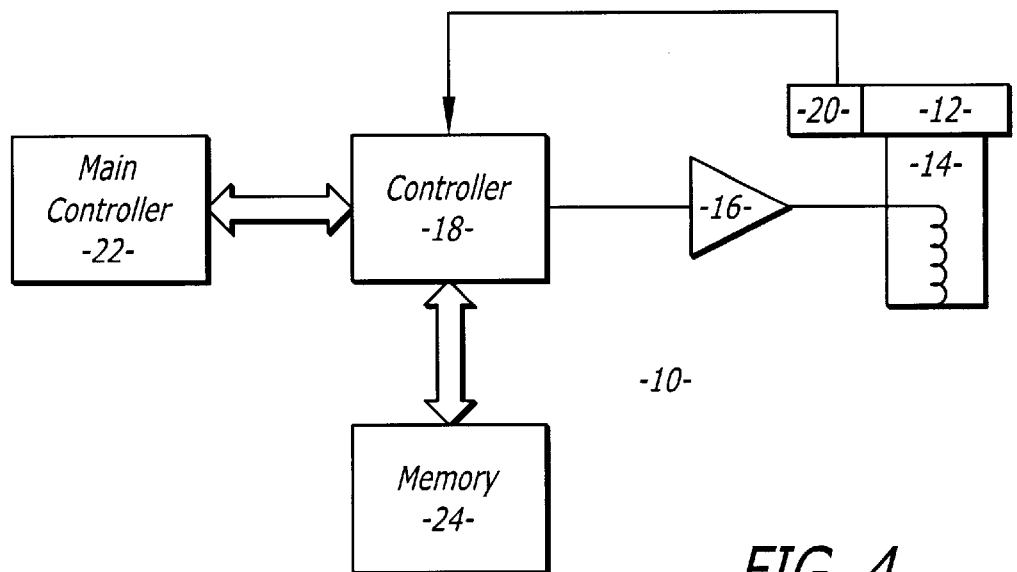
FIG. 4 is a schematic of a mobile stage.

Referring to the drawings more particularly by reference numbers, FIG. 4 shows a mobile stage 10. The mobile stage 10 may be part of a larger system such as equipment used to process a semiconductor wafer. The stage 10 may move the wafer. Although semiconductor process equipment is described, it is to be understood that the stage may be used in any application. For example, the stage may be used in automated equipment used to assemble fiber optic parts.

The stage 10 may include a table 12 that is moved by a motor 14. Although a table 12 is described, it is to be understood that the motor 14 may be attached to any structure. The motor 14 may be a stepper motor or a brushless DC motor.

The motor 14 is connected to a motor driver 16. The driver 16 is connected to a motor controller 18. The driver 16 may contain amplifiers and other circuits that convert the output of the controller 18 to a signal(s) that can drive the motor 14 and move the table 12.

The stage 10 also includes a feedback sensor 20 that is connected to the controller 18. The feedback sensor 20 provides a feedback signal(s) that corresponds to the actual position of the table 12. The sensor 20 may be attached to the table 12, or the motor 14. By way of example, the sensor 20 may be an optical encoder coupled to the output shaft of the motor 14.

The motor controller 18 may be connected to a main controller 22. The main controller 22 can provide commands to the motor controller 18 to move the table 12 to a desired position. The main controller 22 may perform other functions such as generating commands for the other operating subsystems of the equipment. Although two separate controllers 18 and 22 are shown and described, it is to be understood that the functions of the controllers 18 and 22 may be performed by a single controller. The controller 18 may be connected to a memory device 24.

Figure 1:
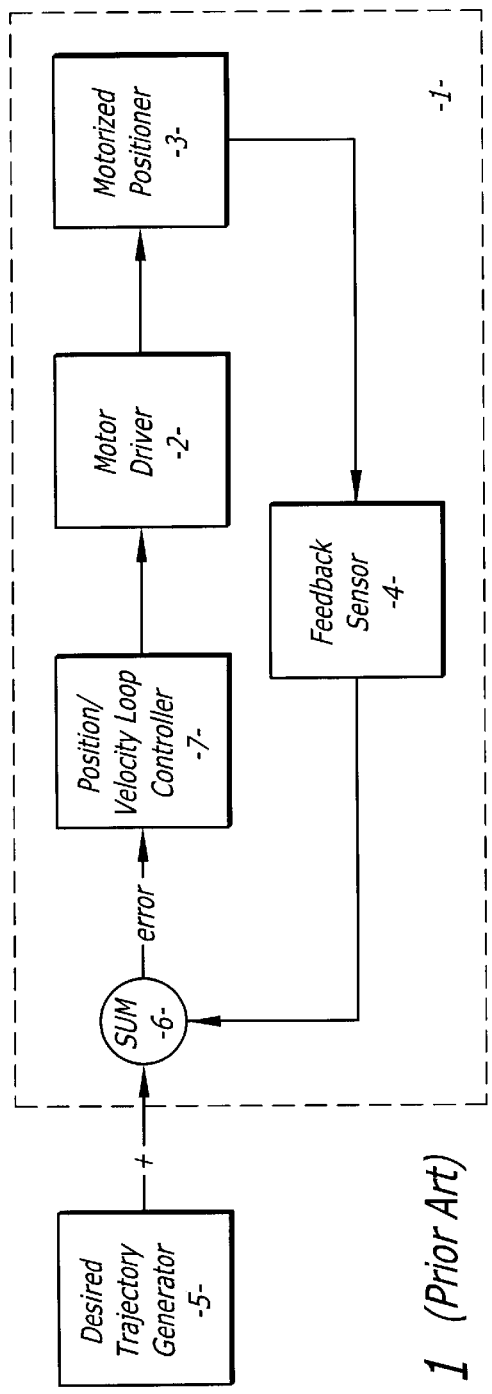
FIG. 1 is a schematic of a motor control system of the prior art.
Figure 5:
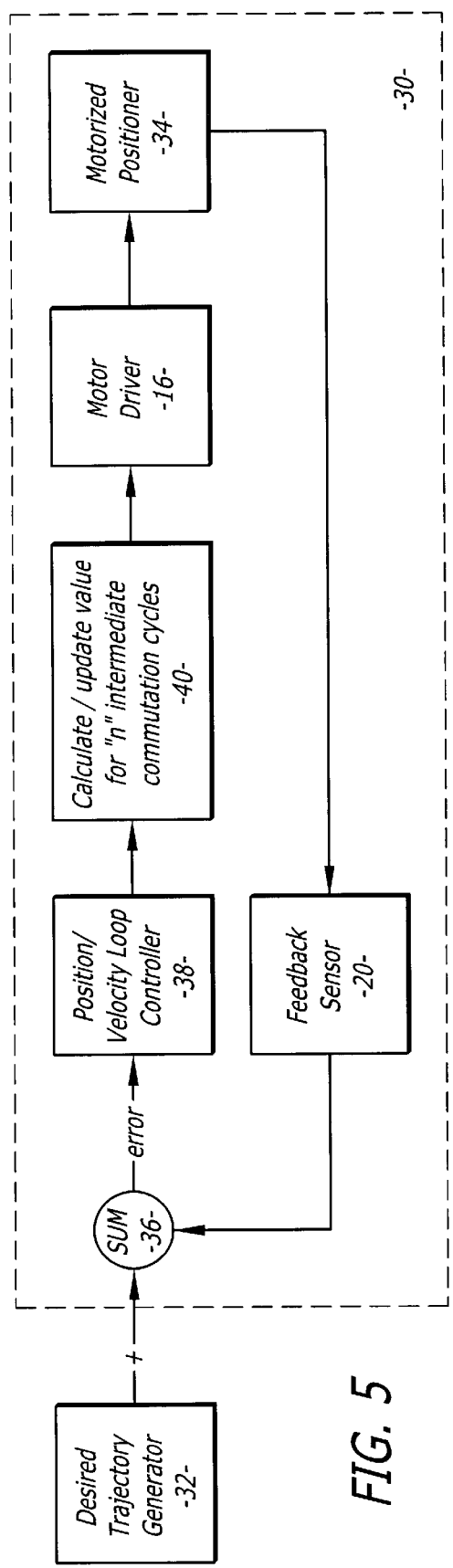
FIG. 5 is a schematic of a motor control system for the mobile stage.

FIG. 5 shows a motor control system 30. The system 30 includes a desired trajectory generator 32 that issues a command to move the table a finite increment. The command may include a desired trajectory value. The generator 32 may be the main controller 22 shown in FIG. 4. The system 30 also includes the motor driver 16, feedback sensor 20 and a motorized positioner 34. The positioner 34 contains a motor.

The desired trajectory value is summed with a feedback signal from the sensor 20 at summing junction 36. If the feedback signal is different than the desired value the summing junction will output an error signal. The error signal represents the amount of movement the table 12 must undergo to reach the desired value. The error signal is processed in block 38 to determine a commutation signal. The commutation signal is provided to the motor driver 16 to drive the motor of the positioner 34. The process of summing the feedback signal with the desired value to generate an error signal occurs once during a "control cycle". The system also has a block 40 where the commutation signal is calculated and updated n times per each control cycle.

The system 30 thus generates a number of commutation signals for each control cycle. The controller 18 can perform the functions provided by elements 36, 38 and 40. The algorithms required to compute the n number of commutation signals is less burdensome on the controller 18 than processing a complete control cycle. Thus the system can provide additional control information without increasing the speed of the controller 18.

Figure 6:
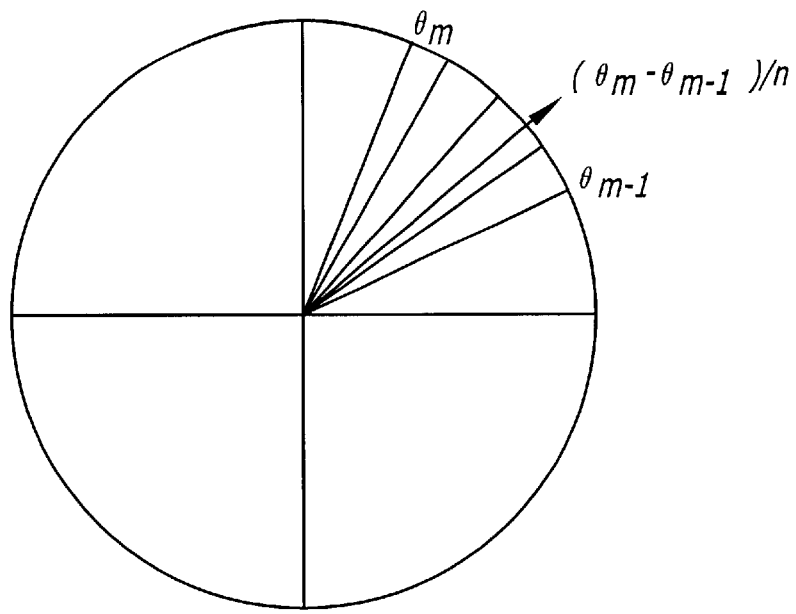
FIG. 6 is an illustration showing the commutation of a motor of the stage.

FIG. 6 shows the commutation signals generated by the system 30. The motor is in an initial position $\theta_{m-1}$. The generator 32 generates a command to move the motor to position $\theta_m$. The summing junction will generate an error signal equal to $\theta_m - \theta_{m-1}$. Block 40 will divide $\theta_m - \theta_{m-1}$ into n parts. Block 40 will then sequentially calculate and generate a commutation signal for the motor n times (commutation cycles) between the positions $\theta_m$ and $\theta_{m-1}$. Instead of sequentially calculating the commutation signals, the controller 18 may simultaneously calculate all of the commutation signals for period $\theta_m - \theta_{m-1}$, and store the values in memory 24. The commutation values may then be sequentially downloaded from memory to drive the motor.

Figure 7:
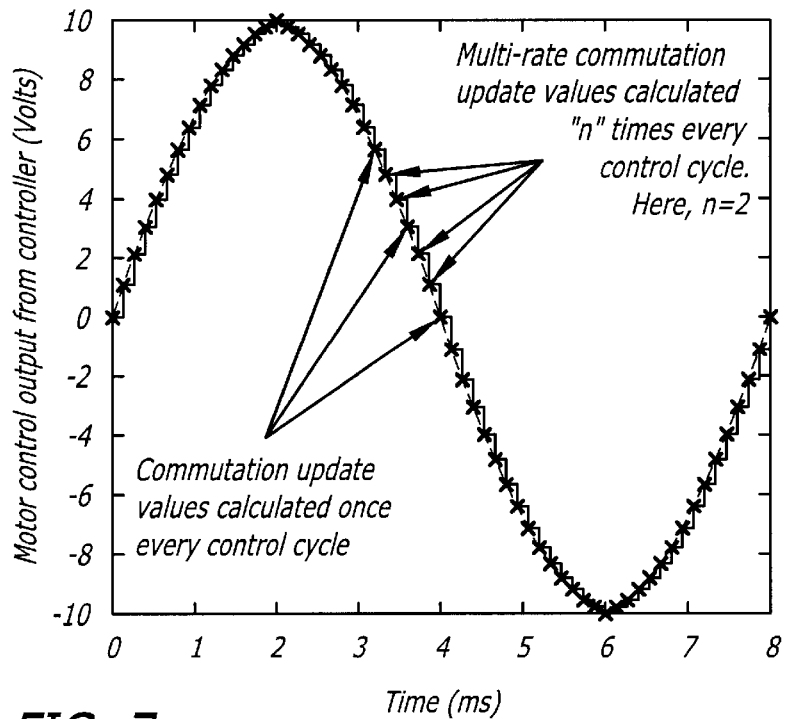
FIG. 7 is a graph showing the output of a controller for the motor control system operating at a relatively low speed.
Figure 8:
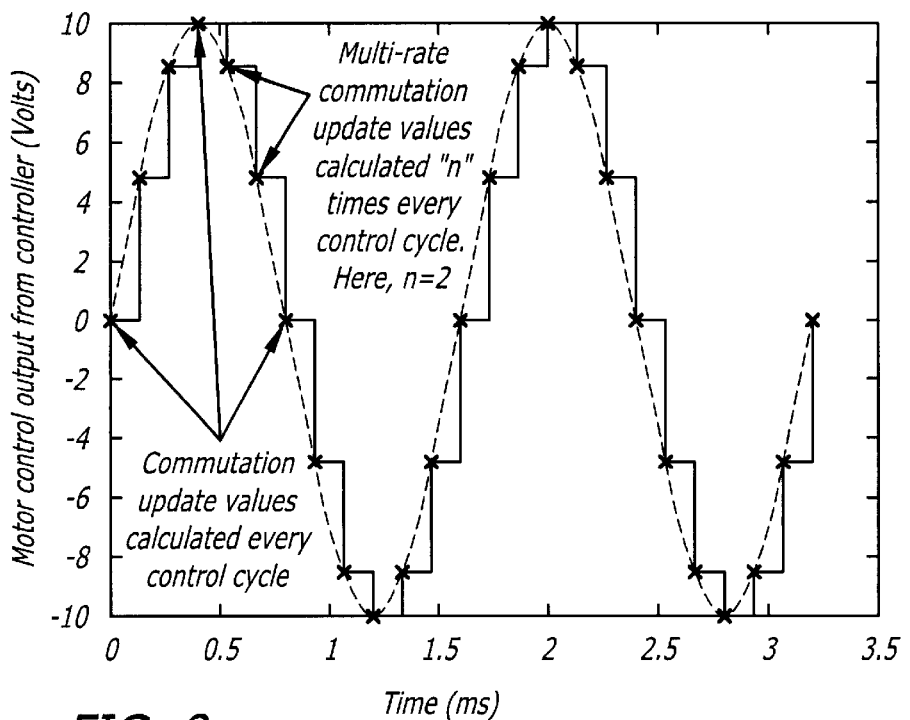
FIG. 8 is a graph similar to FIG. 7 where the motor is operating at a relatively high speed.

FIGS. 7 and 8 show the commutation signals provided by the system 30 for a motor operating at both a low speed and high speed, respectively. Comparing FIGS. 7 and 8 with FIGS. 2 and 3, it can be seen that the system generates a greater number of commutation updates which improves the performance of the motor. This improved performance is achieved without increasing the speed of the motor controller 18.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A motor control system that can be coupled to a motor driven by a commutation signal which is a function of a desired trajectory value, and a feedback signal, comprising:
   a controller that generates an error signal as a function of the desired trajectory value and the feedback signal in a control cycle, within each control cycle said controller generates a plurality of commutation signals that are a function of the error signal.

2. The system of claim 1, wherein said controller computes n number of commutation signals within each control cycle.

3. The system of claim 2, wherein one of said n number of commutation signals is calculated for one commutation cycle.

4. The system of claim 2, wherein n number of commutation signals are computed and stored in memory.

5. A motor control system that can be coupled to a motor driven by a commutation signal which is a function of a desired trajectory value, and a feedback signal, comprising:
   controller means for generating an error signal as a function of the desired trajectory value and the feedback signal in a control cycle, within each control cycle said controller means generates a plurality of commutation signals that are a function of the error signal.

6. The system of claim 5, wherein said controller means computes n number of commutation signals within each control cycle.

7. The system of claim 6, wherein one of said n number of commutation signals is calculated for one commutation cycle.

8. The system of claim 6, wherein n number of commutation signals are computed and stored in memory.

9. A motor assembly, comprising:
   a motor that is driven by a commutation signal;
   a sensor that provides a feedback signal; and,
   a controller that generates an error signal as a function of a desired trajectory value and the feedback signal in a control cycle, within each control cycle said controller generates a plurality of commutation signals that are a function of the error signal.

10. The assembly of claim 9, wherein said controller computes n number of commutation signals within each control cycle.

11. The assembly of claim 10, wherein one of said n number of commutation signals is calculated for one commutation cycle.

12. The assembly of claim 10, wherein n number of commutation signals are computed and stored in memory.

13. The assembly of claim 9, wherein said motor is a stepper motor.

14. The assembly of claim 9, further comprising a stage coupled to said motor.

15. A motor assembly, comprising:
   a motor that is driven by a commutation signal;
   sensor means for providing a feedback signal; and,
   controller means for generating an error signal as a function of the desired trajectory value and the feedback signal in a control cycle, within each control cycle said controller means generates a plurality of commutation signals that are a function of the error signal.

16. The assembly of claim 15, wherein said controller means computes n number of commutation signals within each control cycle.

17. The assembly of claim 16, wherein one of said n number of commutation signals is calculated for one commutation cycle.

18. The assembly of claim 16, wherein n number of commutation signals are computed and stored in memory.

19. The assembly of claim 15, wherein said motor is a stepper motor.

20. The assembly of claim 15, further comprising a stage that is coupled to said motor.

21. A method for controlling a motor, comprising:
   generating a desired trajectory value;
   receiving a feedback signal from a sensor;
   determining a error signal from the desired trajectory value and the feedback signal;
   determining a plurality of commutation signals from the error signal; and,
   transmitting the commutation signals to a motor driver.

22. The method of claim 21, wherein n number of commutation signals are periodically calculated.

23. The method of claim 21, wherein n number of commutation signals are calculated and stored in memory.

* * * * *